H. W. AYLWARD.
ELECTRICAL SIGNALING APPARATUS.
APPLICATION FILED DEC. 10, 1908.
953,575.
Patented Mar. 29, 1910.
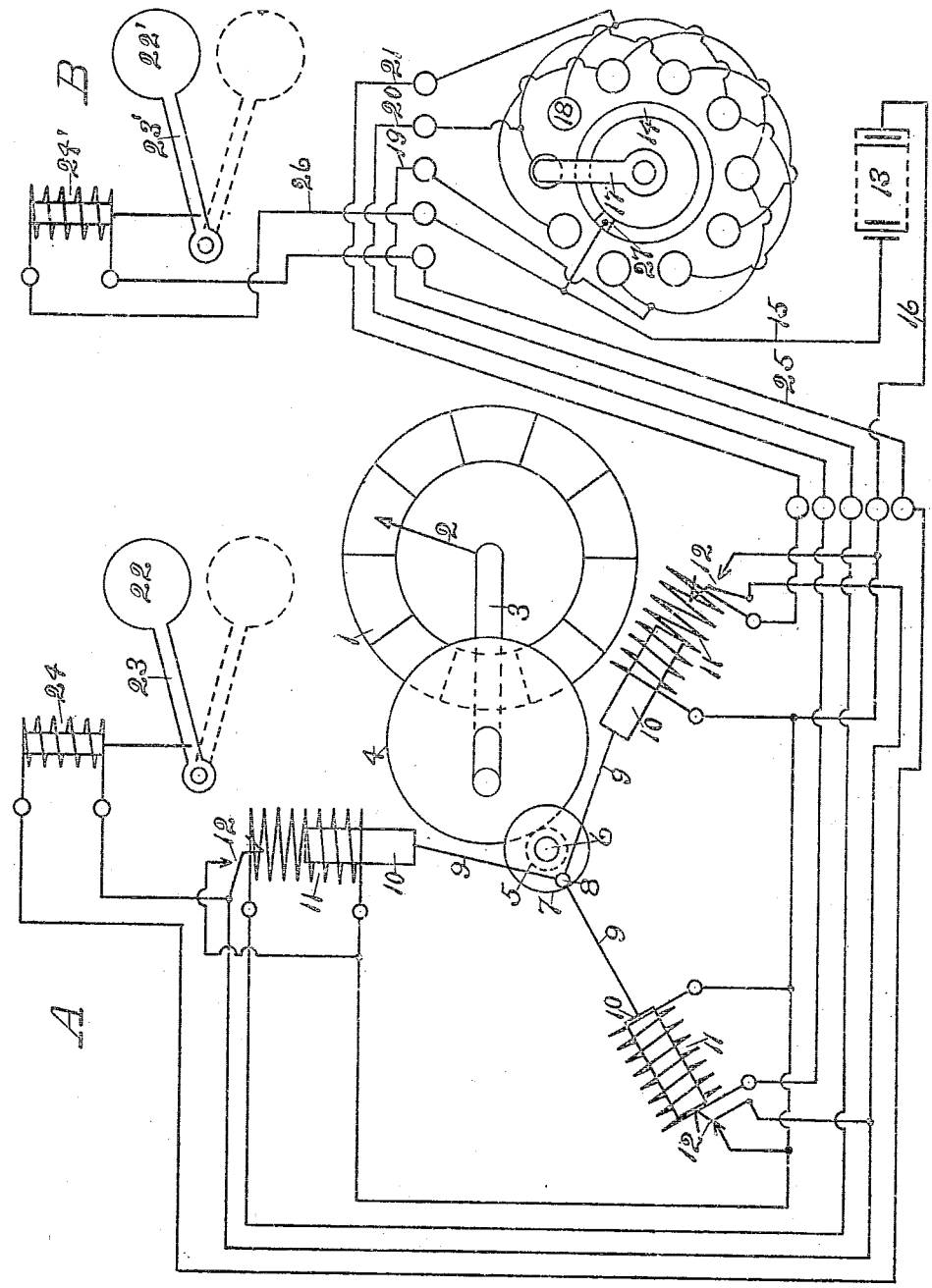
Witnesses
Henry W. Aylward Inventor

UNITED STATES PATENT OFFICE.

HENRY W. AYLWARD, OF BROOKLYN, NEW YORK.

ELECTRICAL SIGNALING APPARATUS.

953,575.　　　　　Specification of Letters Patent.　　Patented Mar. 29, 1910.

Application filed December 10, 1908. Serial No. 436,850.

*To all whom it may concern:*

Be it known that I, HENRY W. AYLWARD, a citizen of the United States, and resident of the borough of Brooklyn, in the county of Kings and State of New York, have invented certain new and useful Improvements in Electrical Signaling Apparatus, of which the following is a specification.

This invention relates to electrically controlled signaling apparatus of that class in which an indicating member of a receiving instrument is caused to move to any one of a number of definite positions in response to the movement of a circuit-closing and circuit-opening member of a transmitting instrument; and the object of the invention is to provide a simple and reliable apparatus of this class.

The invention consists of a receiving instrument having a movable indicating member controlled by a crank-shaft that is adapted to be rotated in a step-by-step manner by connecting arms, actuated by electromagnets, and means for energizing and de-energizing the said electro-magnets.

The invention further consists of means at both the receiving and transmitting stations, for detecting errors or omissions in the transmission of the signals, and in certain details of construction which will be hereinafter described and claimed.

In the accompanying diagrammatic drawing, which shows a receiving instrument A, a transmitting instrument B and the plan of wiring connecting said instruments, similar reference characters denote similar parts.

Referring to the receiving instrument A, the numeral 1 indicates a dial, and 2 denotes an indexing hand adapted to be moved to a series of definite positions on the face of said dial by the axial movement of the shaft 3, which is actuated by a gear-wheel 4 that meshes with a gear-wheel 5. The said gear-wheel 5 is fixed on the shaft 6, on which is also fixed the disk 7, having a crank-pin 8 to which is pivotally connected one end of each of the connecting arms 9, and to the other end of each of the said arms is pivotally connected a magnetizable core 10 of an electro-magnet 11.

For the purpose of illustration, I have shown magnets of the solenoid type, and it will be seen that when any one of these magnets is energized, its core will seek a position that will locate the crank-pin at that point in its path of travel nearest the said magnet, and that the said core will contact with, and close one of the switches 12 for a purpose that will be hereinafter explained.

The numeral 13 indicates the source of current, one pole of which is connected to an annular plate 14 of the transmitting instrument through the wire 15, and the other pole to a return wire 16, common to all the magnets. The said transmitting instrument is provided with a switch-arm 17, pivotally secured at one of its ends, in constant contact with the annular plate 14 and adapted to be brought into successive contact with a plurality of plates 18 corresponding in number to that of the signals which may be indicated on the dial of the receiving instrument. These plates are connected by the line wires 19, 20 and 21 to the magnets 11 of the receiving instrument, their order of connection being such, that as the switch-arm 17 is moved, the circuit will be closed and opened on the said wires successively.

The receiving instrument and the transmitting instrument are each provided with a device for the purpose of detecting errors in the transmission of the signals, which, as shown, consists of a disk 22, (22′) attached to an arm 23, (23′) which is moved by the magnet 24, (24′) when the latter is energized, and, as these magnets are connected to each other by the line wire 25 and to the source of current by the wire 26, they will be energized by the closing of any one of the switches 12, before referred to, of the receiving instrument, thereby indicating at both the receiving and transmitting stations that the receiving instrument has responded to the movement of the switch-arm of the transmitting instrument.

As each of the magnets 11 of the receiving instrument is capable of causing the shaft 6 to make one-third of its rotation, and, as this partial rotation of the shaft may be converted, by means of gearing, into any desired part of a revolution of the indexing hand 2, it is obvious that any desired number of signals may be transmitted without increasing the number of line wires or the number of crank-shaft-actuating magnets, as the successive closing and opening of the circuit on the three line wires 19, 20 and 21, and the consequent successive energizing of the three shaft-actuating magnets 11, may be repeated indefinitely by connecting a plurality of the contact plates 18, of the transmitting instrument to each of the said line wires. In the event that the number of the contact plates 18 is a multiple of the number of the magnets 11, the switch-arm 17, may if desired, be moved continuously in one direction; but when, as shown in the drawing, the number of the said contact plates is not a multiple of the number of the said magnets, it will be seen that two adjacent plates will be connected to the same line wire, making it necessary to provide a stop 27 for the switch-arm, between said plates.

It will be noted from the foregoing description that the magnets 11 of the receiving instrument and the crank-shaft thereby actuated, constitute, what is in effect, a motor, capable of moving an indicating hand in a step-by-step manner in either direction in synchronism with the switch-arm 17 of the transmitting instrument, and it is thought that the operation of the apparatus will be apparent to those skilled in the art.

I claim as my invention:

1. In signaling apparatus of the character described, in combination, a receiving instrument having a plurality of electro-magnets and a crank-shaft arranged to be partially rotated by each of said magnets, means for energizing said magnets successively, an indicating member, differential mechanism for causing said shaft to actuate said indicating member, and auxiliary signaling means for indicating each partial rotation of said shaft, controlled by switches operated by the cores of said electro-magnets.

2. In signaling apparatus of the character described, in combination, a receiving instrument having a plurality of electro-magnets, and a crank-shaft arranged to be rotated in a step-by-step manner by said magnets, an indicating member adapted to be actuated by said crank-shaft, a transmitting instrument adapted to energize and deënergize the magnets of said receiving instrument successively, and auxiliary signaling means for indicating each step of the said crank-shaft at both the receiving and transmitting instruments, operated by the said electro-magnets.

3. In signaling apparatus of the character described, a receiving instrument having a plurality of reciprocally movable members, electro-magnetic means for moving said members, a crank-shaft arranged to be rotated by said members, an indicating member arranged to be moved by said crank-shaft, and auxiliary signaling means controlled by switches operated by said reciprocally movable members.

Signed at borough of Manhattan in the county of New York and State of New York this 9th day of December A. D. 1908.

HENRY W. AYLWARD.

Witnesses:
W. H. ROBERTS,
JOHN J. AYLWARD.